Feb. 7, 1950     D. M. PEARL     2,497,012
BICYCLE STOP LIGHT

Filed July 18, 1947     2 Sheets—Sheet 1

INVENTOR.
Daniel M. Pearl
BY Louis Sheldon
Atty.

Feb. 7, 1950     D. M. PEARL     2,497,012
BICYCLE STOP LIGHT
Filed July 18, 1947     2 Sheets-Sheet 2
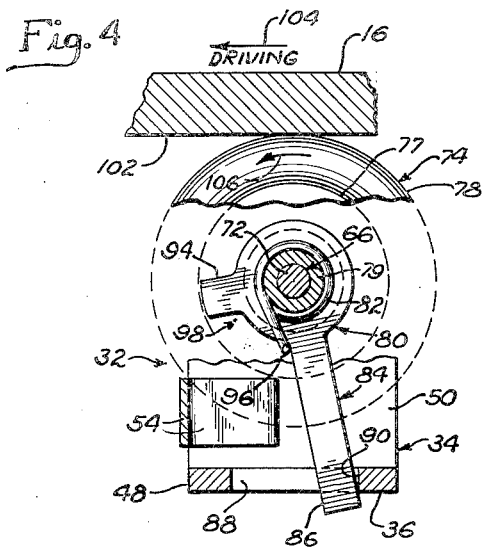
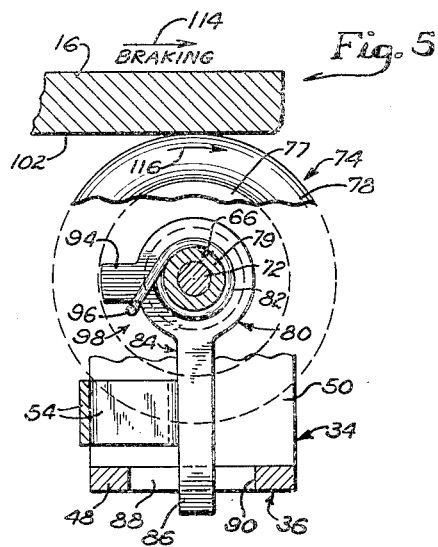
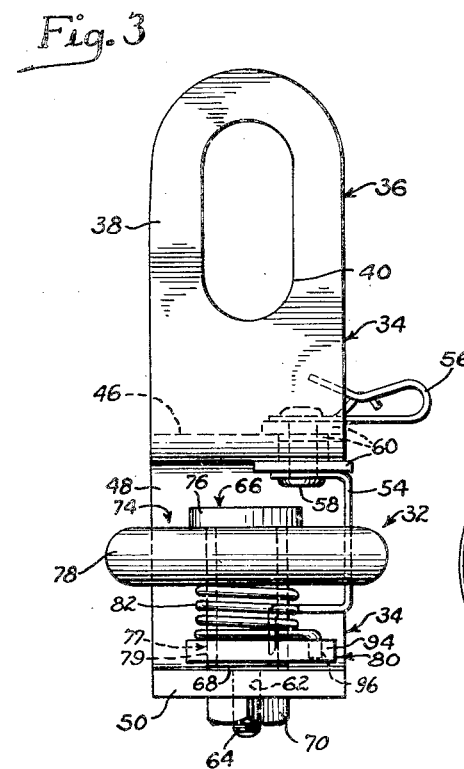
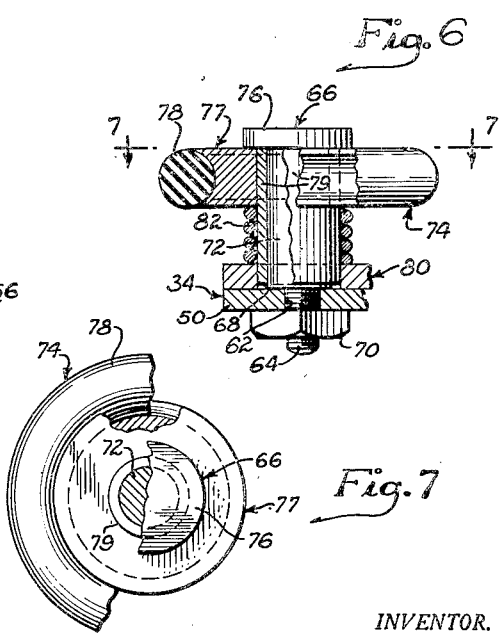
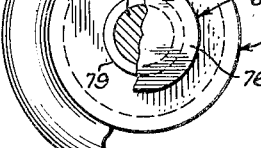
INVENTOR.
Daniel M. Pearl
BY Louis Sheldon
Atty.

Patented Feb. 7, 1950

2,497,012

UNITED STATES PATENT OFFICE 2,497,012

BICYCLE STOP LIGHT

Daniel M. Pearl, Chicago, Ill.

Application July 18, 1947, Serial No. 761,863

15 Claims. (Cl. 200—59)

This invention relates to the control of lights such as stop and tail lights of vehicles and more particularly bicycles.

It is an object of my invention to provide, in a bicycle equipped with a coaster brake and a stop light and electric circuit therefor, a novel, simple automatic switch closed and opened pursuant to movement of a bicycle-driving member respectively in braking and driving directions.

Another object is to provide a novel, simple, readily mountable switch of the above character adapted to be opened and closed pursuant to rotation of a sprocket or other suitable rotating member respectively in driving and braking directions.

A further object is to provide a bicycle, equipped with coaster brake and tail light, with an electric circuit which is hand controlled to switch the light on and off, and, when the hand switch is closed, is automatically switched to a brighter or normal glow pursuant respectively to braking or driving of the bicycle.

An additional object is to provide a switch having a frictionally driven switch arm operative pursuant to movement of a bicycle driving member in driving and braking directions.

It is also an object to provide a bicycle stop light switch having an arm movable to inoperative and operative positions pursuant to driving and braking of the bicycle, provision being made to preclude accidental movement of the arm to and from switch-closing position, as for example while the backlash preceding actual braking is being taken up, or due to vibration.

Further objects and advantages of the invention will appear as the description proceeds.

The invention will be better understood upon reference to the following description and accompanying drawings, in which:

Fig. 3 is an enlarged elevational view taken as indicated by the line 3—3 in Fig. 2.

Fig. 4 is an enlarged fragmentary plan sectional view taken as indicated by the line 4—4 in Fig. 2 and showing the arrangement of the parts when the brake is not applied.

Fig. 5 is a view similar to Fig. 4 but with the parts in the relation occupied when the brake is applied.

Fig. 6 is an enlarged elevational view, partly in section, of the roller and associated mechanism.

Fig. 7 is a fragmentary plan view, partly in section, taken as indicated by the line 7—7 in Fig. 6.

Figure 1:
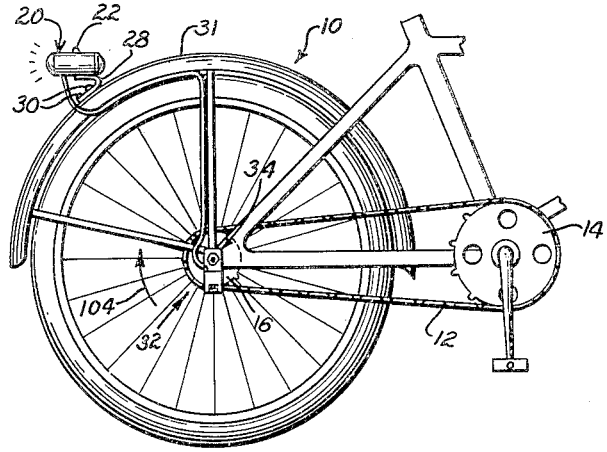
Fig. 1 is a fragmentary side elevational view of the right side of the rear portion of a bicycle equipped with a device constructed in accordance with my invention.
Figure 2:
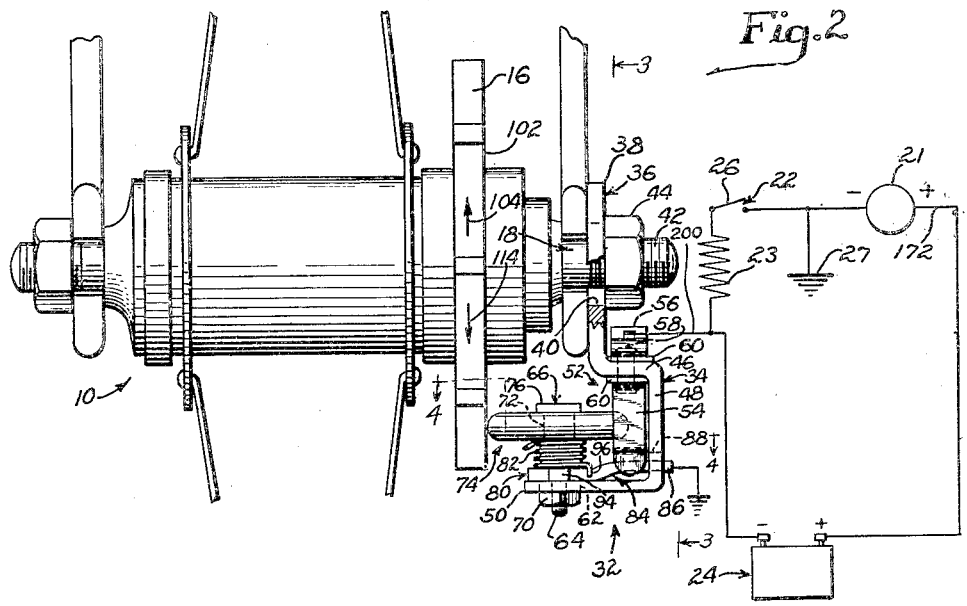
Fig. 2 is a rear elevational view, partly diagrammatic, of parts of the bicycle and the device of my invention.

Referring now more particularly to the drawings, showing an illustrative embodiment of my invention, there is shown at 10 a bicycle having a chain 12 trained about a pedal sprocket 14 and a rear sprocket 16 mounted on the rear axle 18 and connected to a coaster brake not specifically shown but disposed within or in association with the rear axle and operative in the usual manner pursuant to and dependent on the direction of pedaling to either drive or brake the bicycle. A casing 20 is provided, containing a rear light 21 controlled by a manual on-off switch 22 in a series circuit including a resistor 23 and a battery 24 which may be carried by the casing, the negative of the lamp and the movable contact 26 of the hand switch being grounded as at 27 to the casing and through a mounting bracket 28, spot-welded to the casing and screwed as at 30 to the rear fender 31, frame or other suitable part of the bicycle.

A purpose of my invention is to have the rear light 21, when the manual switch 22 is closed, glow at substantially less than full brightness when it functions only as a tail light, as when the bicycle is at rest or coasting or being driven, and at full brightness to function as a stop light when the brake is on, and to employ novel, simple, inexpensive and dependable means for performing such functions. To these ends, I provide a circuit branch including an automatic switch 32, hereinafter described in detail, in parallel with the circuit branch comprising the resistor 23 and hand switch 22, so that, when the automatic switch is closed, it short-circuits the resistor and hand switch and thus enables the light to glow more brightly, regardless whether the hand switch is open or closed.

The automatic switch 32 may comprise a metal bracket 34 which may be of a modified L shape, including a stepped leg 36 having an upper portion 38 with a hole 40 through which the threaded end 42 of the rear axle 18 passes for the reception of a nut 44, said hole being elongated to enable the bracket to be adjusted relative to the axle.

The remaining portions 46 and 48 of the leg 36 together with the other leg 50 of the bracket 34 form a pocket or alcove 52 in which a preferably leaf spring contact 54 projects. A Fahnestock or other suitable wire anchoring clip 56 is disposed at the outer side of the leg portion 46, and both the clip and the contact 54 are riveted as at 58 to said leg portion and electrically insulated therefrom as shown at 60. The leg 50 has a hole 62 through which passes the reduced threaded end 64 of a stub axle 66 in the form of a pin having a shoulder 68 held against the inner side of the leg by a nut 70. The shank portion 72 of the pin 66 is cylindrical and journals a roller 74 disposed adjacent the head 76 of the pin, said roller comprising a rope pulley type wheel 77 with a soft rubber or the like tire 78 and having an integral or press-fitted extended hub 79 slidably receiving said shank portion, said wheel having an overall axial length slightly less than the length of said shank portion so that, when the pin is tightly mounted on the bracket leg 50, the roller is free to turn.

A spider 80 slidably surrounds the hub 79, and a coil spring 82 embraces the hub and is under compression between and may exert end thrust on the wheel 77 and the spider so as to frictionally resist but not prevent their rotation in either direction about the stub axle pin 66. The spider 80 has a switch arm 84 with an offset 86 movable into and out of engagement with the contact strip 54, the bracket portion 48 having a slot 88 in which the offset projects, said strip and the end 90 of said slot defining the limits of rotation of the switch arm and hence of the spider. The spider 80 has a lug 94 at a substantial angle to the switch arm 84. The coil spring 82 has an offset end 96 projecting in the space 98 between the spider arm 84 and the lug 94.

The tire 78 engages and is frictionally driven by the adjacent face 102 of the rear sprocket 16, the hole 62 in the bracket leg 50 being elongated to enable the tire to be adjusted and secured in proper engagement with said sprocket wheel face, the spider switch arm 84 being of such length as to insure engagement of its offset end 86 with the end 90 of the bracket slot 88 and the spring contact 54 regardless of the adjusted position of the stub axle 66.

Assuming, now, that the bicycle is being driven, i. e., pedaled forward, so that the rear sprocket 16 rotates in the direction indicated by the arrow 104, the top of the sprocket moving forward and the bottom of the sprocket rearward, and referring more particularly to Fig. 4, the sprocket thus causes the roller 74 to rotate in the direction indicated by the arrow 106, the spring 82, through friction with the roller hub 79, being caused to rotate in the same direction so that when the end 96 of the spring engages the spider arm 84, the spider, also, turns in that direction and the arm is thus held out of engagement with the contact 54 and in engagement with the end 90 of the slot 88, which stops further rotation of the spring and spider but not of the roller.

When the manual switch 22 is closed, and when the brake is off, the lamp 21 glows dimly because of the resistor 23, and thus functions only as a tail light. However, when the brake is applied, then, regardless whether the hand switch 22 is closed or open, the rear sprocket 16 turns in the direction of the arrow 114, the top of the sprocket turning rearward and the bottom of the sprocket forward, with the result that the roller 74 is rotated in the direction indicated by the arrow 116, whereupon the spring 82 will be turned, by reason of the friction between it and the roller, in the same direction with the roller, and, when the spring end 96 has traversed the lost motion distance 98 between the spider arm 84 and the spider lug 94, said spring end will turn the spider 80 until the spider arm engages the contact 54, thereby closing the automatic switch 32, so that the resistor 23 and hand switch 22 will be short-circuited and the lamp 21 will glow with increased brightness to function as a stop-light.

The spring 82 is wrapped about the hub sleeve 79 with a friction fit which permits the roller 74 to be turned relative to the spring when rotation of the spring is obstructed, but causes the spring to turn with the roller when rotation of the spring is not obstructed. The spring 82 is preferably under some compression between the wheel 77 and the spider 80. The compression brings about frictional end engagement between the spring 82 and the wheel 77 to augment the friction above noted, and between the spring and the spider 80. The friction between the spring 82 and the spider 80, however, is less than the resultant friction between the spider and the bracket leg 50, since the area of contact between the spider and said leg is substantially greater than that between the spring and the spider, with the result that the spider is held from turning when the spring turns, until the offset end 96 of the spring has traversed the lost motion arc 98 between the spider lug 94 and the spider arm 84. The friction between the spring 82 and the roller wheel 77 and between the spring and the spider 80 exceeds the friction between the spider and the bracket leg 50, so that, when the aforesaid lost motion of the spring has occurred, further rotation of the roller 74 will operate, through engagement of the spider lug 94 or spider arm 84, as the case may be, to rotate the spider until its arm reaches one or the other limit of its rotation. If the spring 82 is not under end compression, the lost motion may nevertheless take place, due to inertia of the spider 80 and/or the friction between the spider and the leg 50 under such circumstances.

An insulated wire 200 extends from the resistor 23 through a hole in the casing 20 and is adapted at its outer end to be received and held by the Fahnestock clip 56, with which the spring contact 54 of the automatic switch 32 is connected, as aforesaid.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. A stop-light switch for a coaster-brake equipped bicycle carrying a battery and a stop-light grounded to the bicycle, said switch comprising a first contact, a second contact movable into and out of engagement with said first contact, a metal support for said contacts and adapted to be grounded to the bicycle, one of said contacts being insulated from said support, the other contact being electrically connected with said support, a roller carried by said support and engageable with a movable part of the bicycle driving mechanism so as to be rotated thereby, said support having a stop between which and said first contact said second contact is confined in its movement, a lost motion friction drive connection between said roller and said movable contact whereby movement of said movable contact selectively from said first contact toward said stop or from said stop toward said first contact is initiated only after a predetermined amount of rotation of said roller in the corresponding direction, said first contact being arranged to be engaged by said movable contact only upon actuation of the brake, and means enabling said roller to be adjusted into proper driving relation to the bicycle driving mechanism.

2. A stop-light switch for a coaster-brake equipped bicycle carrying a battery and a stoplight grounded to the bicycle, said switch comprising a first contact, a second contact movable into and out of engagement with said first contact, a metal support for said contacts and adapted to be grounded to the bicycle, one of said contacts being insulated from said support, the other contact being electrically connected with said support, a roller carried by said support and engageable with a movable part of the bicycle driving mechanism so as to be rotated thereby, said support having a stop between which and said first contact said second contact is confined in its movement, a lost motion friction drive connection between said roller and said movable contact whereby movement of said movable contact selectively from said first contact toward said stop or from said stop toward said first contact is initiated only after a predetermined amount of rotation of said roller in the corresponding direction, said first contact being arranged to be engaged by said movable contact only upon actuation of the brake.

3. In combination with the driving mechanism of a bicycle, a roller adapted to be positioned in driving relation with the bicycle driving mechanism, a movable switch contact, a stud journalling the roller and contact, and a stationary switch contact and an insulated mounting means therefor: a generally L-shaped metal switch bracket, one arm of said bracket having a hole to permit passage therethrough of the threaded end of the rear axle of a bicycle, said hole being dimensioned to permit adjustment of said bracket transversely relative to the axis of the axle, the other arm of said bracket having a hole for the reception of a stud adapted to journal a roller and a movable switch contact, said hole being dimensioned to enable the stud to be adjusted to place the roller into driving relation with a part of the bicycle driving mechanism, said bracket having a hole for the reception of insulated mounting means for a stationary contact, said bracket having a hole for the reception of a part of and dimensioned to permit but limit rotation of the first-mentioned contact.

4. A switch bracket having a hole to permit passage therethrough of the threaded end of the rear axle of a bicycle, said hole being dimensioned to permit adjustment of said bracket transversely relatively to the axis of the axle, said bracket having a hole for the reception of a stud adapted to journal a roller and a movable switch contact, said hole being dimensioned to enable the stud to be adjusted to place the roller into driving relation with a part of the bicycle driving mechanism, said bracket having a hole for the reception of insulated mounting means for a stationary contact, said bracket having a hole for the reception of a part of and dimensioned to permit but limit rotation of the first-mentioned contact.

5. In an automatic switch for operating the tail-light as a stop-light when the brake is applied on a bicycle equipped with a coaster-brake mechanism: a metal support adapted to be grounded to a bicycle, relatively fixed and movable contacts, one of said contacts being electrically connected to and the other contact being insulated from said support, means having a slip friction drive relation with said movable contact and drivably engageable with a movable part of a bicycle coaster brake mechanism so as to move when such part moves pursuant respectively to forward and brake pedaling of the bicycle, said fixed contact being arranged to limit movement of said movable contact in the direction corresponding to brake pedaling of the bicycle, and means limiting movement of said movable contact in the direction away from said fixed contact, corresponding to the forward pedaling of the bicycle, whereby, when the bicycle is brake-pedaled, said movable contact will be moved into engagement with said fixed contact, and when the bicycle is forward-pedaled, said movable contact will be moved out of engagement with said fixed contact.

6. A stop-light switch for a coaster-brake equipped bicycle carrying a battery and a stop-light grounded to the bicycle, said switch comprising a first contact, a second contact movable into and out of engagement with said first contact, a metal support for said contacts and adapted to be grounded to the bicycle, one of said contacts being insulated from said support, the other contact being electrically connected with said support, said support having a headed stud, a friction roller having a projecting hub sleeve disposed about said stud and loosely confined between said support and the head of said stud, said movable contact comprising a collar coaxial with and rotatable relative to said sleeve, a spring coiled about and frictionally engaged with said sleeve and having an offset, said collar having circumferentially spaced stops between which said offset projects, affording a lost motion rotary drive between said roller and said collar, said collar having an arm, said support having a stop between which and said first contact said arm is movable as said collar rotates, said roller being frictionally engageable with a rotary part of the bicycle so as to be rotated thereby, said first contact being arranged to be engaged by said arm only upon actuation of the brake, the lost motion of said spring relative to said collar being provided to preclude rotation of said arm from engaged or disengaged relation, as the case may be, to said first contact pursuant to relatively slight movements of said roller such as may occur during coasting or vibration in driving over rough terrain.

7. A switch comprising a relatively fixed contact, a movable contact member, an actuating member therefor, said actuating member being selectively movable in either of two directions, one of said members having spaced portions, the other member having a portion confined between and engageable selectively with only one or the other of said spaced portions, movement of said movable contact member selectively into or out of engagement with said fixed contact being initiated only after a preliminary movement of said actuating member in the corresponding direction.

8. In combination with the driving mechanism of a bicycle, a roller adapted to be positioned in driven relation with the bicycle driving mechanism, a movable switch contact, a stud journaling the roller and contact, and a stationary switch contact and an insulated mounting means therefor: a generally L-shaped metal switch bracket, one arm of said bracket having an elongated hole extending substantially perpendicular to the other arm of said bracket and of a width to permit passage therethrough of the threaded end of the rear axle of a bicycle and of a length to permit adjustment of said bracket relative to the axle, said other arm having an elongated hole extending substantially perpendicular to said one arm and of a width to receive the stud and of a length to permit adjustment of the stud relative to said other arm to enable a roller journaled on the stud to be adjusted into driven relation with a part of the bicycle driven mechanism, said one arm having an offset cooperating with said other arm in providing an alcove into which the roller and both contacts are adapted to project, said offset having a hole for the reception of the insulated mounting means and a hole for the reception of a contact journaled on the stud.

9. In combination with a bicycle equipped with a stop-light and a coaster brake including the driving sprocket: a switch for the stop-light and comprising relatively movable contacts and means for opening and closing said switch, said means comprising a soft resilient roller frictionally engageable with a face of the sprocket, means journaling said roller so that said roller, when in such engagement, will be rotated in one direction or the other, depending on the direction of rotation of the sprocket, a slip drive connection between said roller and one of said contacts for moving said one contact selectively into and out of touch with the other contact, and means limiting movement of said one contact notwithstanding continued rotation of said roller.

10. A stop-light switch for a coaster-brake equipped bicycle carrying a battery and a stop-light grounded to the bicycle, said switch comprising a first contact, a second contact movable into and out of engagement with said first contact, a metal support for said contacts and adapted to be grounded to the bicycle, one of said contacts being insulated from said support, the other contact being electrically connected with said support, a roller carried by said support and engageable with a movable part of the bicycle driving mechanism so as to be rotated thereby, said support having a stop between which and said first contact said second contact is confined in its movement, a lost motion drive relation between said roller and said movable contact whereby movement of said movable contact selectively from said first contact toward said stop or from said stop toward said first contact is initiated only after a predetermined amount of rotation of said roller in the corresponding direction, said first contact being arranged to be engaged by said movable contact only upon actuation of the brake, and means enabling said roller to be adjusted into proper driving relation to the bicycle driving mechanism.

11. A stop-light switch for a coaster-brake equipped bicycle carrying a battery and a stop-light grounded to the bicycle, said switch comprising a first contact, a second contact movable into and out of engagement with said first contact, a metal support for said contacts and adapted to be grounded to the bicycle, one of said contacts being insulated from said support, the other contact being electrically connected with said support, a roller carried by said support and engageable with a movable part of the bicycle driving mechanism so as to be rotated thereby, said support having a stop between which and said first contact said second contact is confined in its movement, a lost motion drive relation between said roller and said movable contact whereby movement of said movable contact selectively from said first contact toward said stop or from said stop toward said first contact is initiated only after a predetermined amount of rotation of said roller in the corresponding direction, said first contact being arranged to be engaged by said movable contact only upon actuation of the brake.

12. A stop-light switch for a coaster-brake equipped bicycle, said switch comprising a first contact, a second contact movable throughout a limited range into and out of engagement with said first contact, a rotary member having means adapted to be positioned in driven relation with a bicycle driving mechanism to rotate in one direction or the other, means supporting said contacts and rotary member, an element having a slip driven relation with said rotary member for both directions of rotation of said rotary member, said element having a lost motion drive relation with said movable contact for both directions of movement of said element, said first contact being arranged to be engaged by said movable contact only upon rotation of said rotary member pursuant to actuation of the brake, the lost motion between said element and said movable contact being provided to preclude engagement or disengagement, as the case may be, between said contacts pursuant to relatively slight movements of said rotary member such as may occur during coasting or vibration in driving over rough terrain.

13. In a bicycle switch including an actuating rotor adapted to be positioned in driven relation with the bicycle driving mechanism, a switch contact movable by the rotor, a stud journaling the rotor, and a stationary switch contact: a switch bracket having a pair of portions at an angle to each other, each portion having a slot extending toward the other portion, one slot being of a width to permit passage therethrough of the threaded end of the rear axle of the bicycle and of a length to permit adjustment of said bracket relative to the axle, the other slot being of a width to receive the stud and of a length to permit adjustment of the stud relative to said bracket to enable the rotor to be adjusted into driven relation with a part of the bicycle driving mechanism, said bracket having means for supporting the stationary contact and an alcove into which the rotor is adapted to project.

14. A switch comprising a relatively fixed contact, a movable contact member, an actuating member therefor, said actuating member being selectively movable in either of two directions, driving means having a slip friction driving relation with said actuating member for both of said directions, one of said members having spaced portions, the other member having a portion confined between and engageable selectively with only one or the other of said spaced portions, movement of said movable contact member selectively into or out of engagement with said fixed contact being initiated only after a preliminary movement of said actuating member in the corresponding direction.

15. In a stop-light switch for a coaster-brake equipped bicycle, a pair of contacts, a soft resilient roller adapted to frictionally engage a face of the coaster-brake sprocket, means journaling said roller so that said roller, when in such engagement, will be rotated in one direction or the other, depending on the direction of rotation of the sprocket, means providing a slip drive relation between said roller and one of said contacts for moving said one contact selectively into and out of touch with the other contact, and means limiting movement of said one contact notwithstanding continued rotation of said roller.

DANIEL M. PEARL.

REFERENCES CITED

The following references are of record in the file of this patent:

UNITED STATES PATENTS

| Number | Name | Date |
| --- | --- | --- |
| 2,090,805 | Oliver | Aug. 24, 1937 |
| 2,271,664 | Sarchino | Feb. 3, 1942 |
| 2,289,466 | Stephen | July 14, 1942 |